Figure 1:
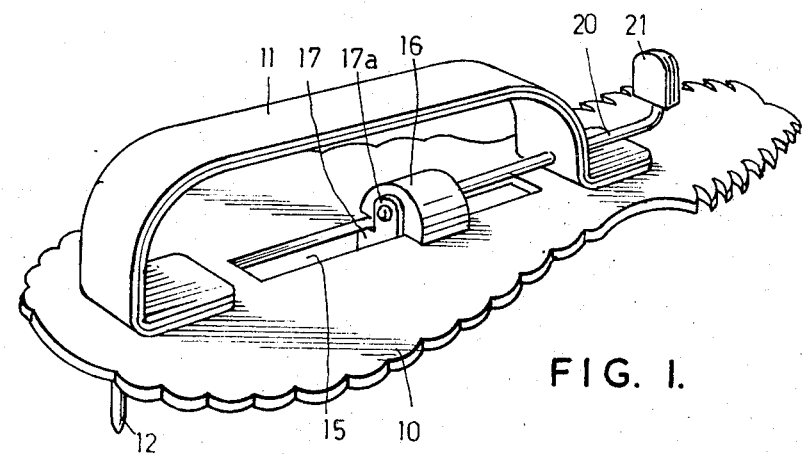

United States Patent [19]
Ashdown

[11] 3,769,706  
[45] Nov. 6, 1973

[54] PINEAPPLE PEELER

[75] Inventor: Raymond George Ashdown, Kedron, Australia

[73] Assignee: Ashdown Inventions Pty., Ltd., Kedron, Brisbane, Queensland, Australia

[22] Filed: Oct. 12, 1972

[21] Appl. No.: 296,839

[52] U.S. Cl. .............................................. 30/113.3
[51] Int. Cl. .............................................. A47j 25/00
[58] Field of Search ........................ 7/1 A, 14.1 R; 30/113.1, 113.2, 113.3, 173, 174, 279 R, 286, 287, 288, 289, 299, 304; 99/541, 542, 574, 593

[56] References Cited
UNITED STATES PATENTS 1,182,629  5/1916  Birnbaum .......................... 30/113.3
1,389,765  9/1921  Krota ................................ 30/113.3

*Primary Examiner*—James L. Jones, Jr.
*Assistant Examiner*—Mark S. Bicks
*Attorney*—Donald D. Jeffery

[57] ABSTRACT

A pineapple peeler and corer has a base carrying a spike for inserting axially into the exposed end of the core of a pineapple with an end removed, a coring blade for insertion into the flesh adjacent to the core, and also an adjustably mounted peeling blade for insertion into the flesh adjacent to the peel and an associated guide for location adjacent to the outside of the peel to guide the peeling knife when the base is rotated about the spike by a handle to separate an annular section of the flesh from the core and peel.

2 Claims, 2 Drawing Figures

PATENTED NOV 6 1973　　　　　　　　　　　　　　　　　　3,769,706

PINEAPPLE PEELER

This invention relates to a device for peeling and coring pineapples.

A pineapple is fairly troublesome to prepare for the table in sliced form, by removing the ends, removing the rough irregular skin, slicing the fruit and excising the core portions. Sometimes the fruit is sliced unskinned, and the peripheral skin portion is cut from each slice; but in any case the process is time consuming and difficult, and unless a good deal of care is taken, the prepared slices are not usually very neat and attractive in appearance.

The general object of the present invention is to provide a simple device by means of which a pineapple may be quickly and easily prepared for the table in the form of peeled and cored slices which are visually very attractive.

According to the invention, the peeling and coring device has a base with a flat undersurface from which, towards one end, a spike extends perpendicularly, the base having mounted above it a handle by means of which the base may be rotated manually about the spike. A coring blade substantially in a plane tangential to a circle centred on the axis of the spike extends down from the base. A traveller, mounted on the base for adjustable movement towards or away from the spike carries a peeling blade substantially parallel to the coring blade, the two blades having cutting edges at the same side, and the traveller also carries a peeling guide, extending downwardly from the undersurface of the base, and spaced further from the spike than the peeling blade. A slice having been cut from an end of a pineapple, the spike may be inserted axially into the exposed end of the pineapple core, the coring blade being inserted into the flesh of the pineapple near to the core, the peeling blade being inserted into the flesh near to the peel of the pineapple, the guide being located outwardly of the peel, so that, by rotating the device about the spike, by means of the handle, the coring and peeling blades are caused separate portions of core and peel from the intermediate flesh to enable a cored and peeled slice to be cut from the pineapple.

Figure 2:
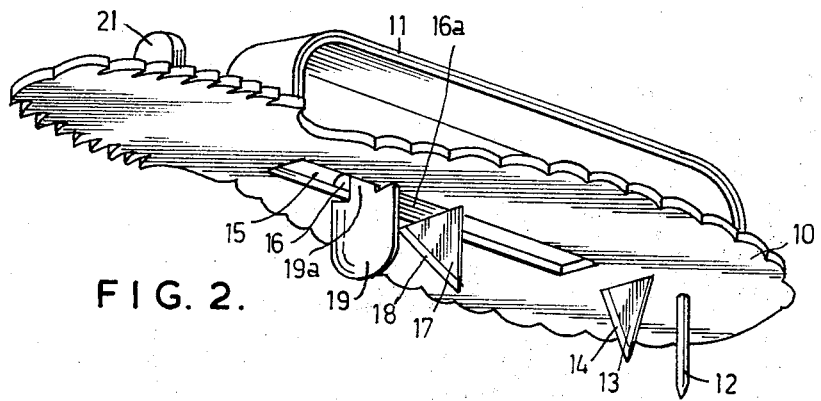

In the drawings:

FIG. 1 is a perspective view of a pineapple peeling and coring device seen from above, and FIG. 2 is a perspective view of the device seen from below.

The peeling and coring device illustrated includes a base plate 10 which may be made of any suitable sheet material and which in the example shown is made to a shape resembling the profile of a pineapple.

A longitudinal handle 11 is secured to the upper face of the base plate 10, and consists of a strip of sheet material shaped appropriately for grasping in the hand and for attachment to the base plate.

A spike 12 extends perpendicularly down from the base plate 10, near to one end thereof.

Fairly near to the spike 12, a fixed coring blade 13 extends perpendicularly down from the underside of the base plate 10. This blade is substantially flat, its base tangential to a circle centred on the axis of the spike, and is substantially of isosceles triangular shape, one of its side edges being sharpened to a cutting edge 14.

A longitudinal slot 15 is formed centrally through the base plate, its longitudinal centre line radial with respect to the spike 12 and perpendicular to the plane of the coring blade 13. A traveller 16, located for the greater part above the base plate 10, has a downwardly extending projection 16a closely but slidably engaged in the slot 15.

Secured to the end of the traveller nearer to the spike 12 is a lug 17a extending up through the slot 15 from a peeling blade 17 which extends perpendicularly down from the base plate 10, parallel to the coring blade, the top part of the peeling blade, which is of right angle triangular shape, being wider than the slot 15. The peeling blade has an oblique cutting edge 18 to the same side as that of the coring blade.

Secured to the end of the traveller 16 remote from the spike 12 is a lug 19a extending up through the slot 15 from a guide member 19 which for the greater part is parallel to the peeling blade 17, but with its edge dished in the direction away from the peeling blade.

An adjustment rod 20 extends longitudinally from the traveller 16, in the direction away from the spike 12, and passes slidably through an aperture in an end of the handle 11, the rod then being bent upwardly and having an adjustment knob 21 secured to its extremity. By means of this knob, the traveller, with the attached guide member 19 and peeling blade 17, may be moved nearer to or further from the spike 12. The adjustment rod 20 may serve to secure the guide member and peeling blade to the traveller.

In use, one end of a pineapple is cut off with a knife. The spike 12 is then inserted more or less axially into the exposed end of the core of the pineapple, and at the same time the coring blade is inserted into the flesh of the fruit adjacent to the core, and the peeling blade, its position adjusted by the adjustment knob 21, is driven into the flesh near the skin of the pineapple, the guide member 19 being located adjacent to the outside of the skin.

By means of the handle 11, the device is then turned through a full circle about the spike 12, so that the coring blade 13 makes a cut about the exposed end of the core, and the peeling blade 17 separates an annular section of the skin from the flesh.

The device is then removed from the pineapple, and with a knife a slice is cut from the end of the pineapple. From this slice, the core and the ring of skin will fall, to leave a visually attractive peeled and cored pineapple ring. This process is repeated to core, peel and cut further pineapple rings.

It will be found that the peeling knife, guided by the guide member, will follow the correct path about the pineapple without any tendency to move outwardly cutting the peel, since its tendency will be to move through the softer flesh, the guide member restraining it against too deep entry.

What I claim is:

1. A pineapple peeler and corer including:
   a base;
   a handle on the base;
   a spike extending downwardly from the underside of the base;
   a coring blade extending downwardly from the underside of the base;
   a traveller slidable on the base substantially radially with respect to the spike;
   a peeling blade mounted on the traveller, extending downwardly from the underside of the base and spaced further from the spike than the coring blade; and a guide mounted on the traveller, extending downwardly from the underside of the base and spaced further from the spike than the peeling blade.

2. A pineapple peeler according to claim 1 wherein:

the handle is mounted above the base;

the traveller is movable in a slot in the base; and an adjustment rod extends from the traveller and has an adjustment knob at its end remote from the traveller.

* * * * *